Sept. 26, 1939.  R. L. STRICKLAND ET AL  2,173,985

THIN BABBITT BEARING

Filed June 1, 1939

INVENTORS
Rudolph L. Strickland
BY Jerome J. Frank
Daniel G. Cullen.  ATTORNEY.

Patented Sept. 26, 1939

2,173,985

UNITED STATES PATENT OFFICE 2,173,985

THIN BABBITT BEARING

Randolph L. Strickland and Jerome J. Frank, Detroit, Mich.

Application June 1, 1939, Serial No. 276,914

1 Claim. (Cl. 308—237)

This invention relates to bearing combinations, such as those including a shaft member and a bearing.

One known type of bearing for shafts consists of a soft liner member on a hard backing, with the liner member having a thickness of about .0150 inch. The liner member conforms itself to minute variations in contour of the shaft during the running-in period and also absorbs particles which may be found in the normal clearance between the shaft and the bearing. A disadvantage of such bearings is that the liner member has a tendency to crack under load.

Another known type of bearing also consists of a soft liner member on a hard backing; but here the liner member is reduced in thickness by suitable processing so as to be in the neighborhood of .0002 to .0005 inch. A disadvantage of a bearing having a liner member so thin is that the bearing can not function properly to absorb particles which may be found in the normal clearance between the shaft and the bearing. That clearance, for a two inch bearing, is generally around .0005 to .0025 inch.

The object of this invention, therefore, is to provide a bearing combination in which this cracking tendency is reduced without impairment of the tendency of the liner member to conform to the shaft or to absorb particles. This object we attain by having the liner member formed as thin as possible and yet thick enough to absorb particles in the normal clearance between the shaft and the bearing. Since the normal clearance at the present time, for two inch bearings, is in the neighborhood of .0005 to .0025 inch, we have made the liner member of approximately .0010 to .0050 inch and we have discovered that a bearing with a liner member of that dimension is far more satisfactory than a similar bearing having a liner member of what is now accepted as the standard dimension, .0150 inch, and superior to a similar bearing member wherein the liner has a thickness in the neighborhood of .0002 to .0005 inch. In other words, in our bearing the liner member is approximately one-fifteenth to one-third as thick as conventional thick liners and yet two to twenty-five times as thick as what had previously been suggested as the alternate to the thick liner, and this liner member has proven more satisfactory than either the too thick or the too thin liner.

Figure 2:
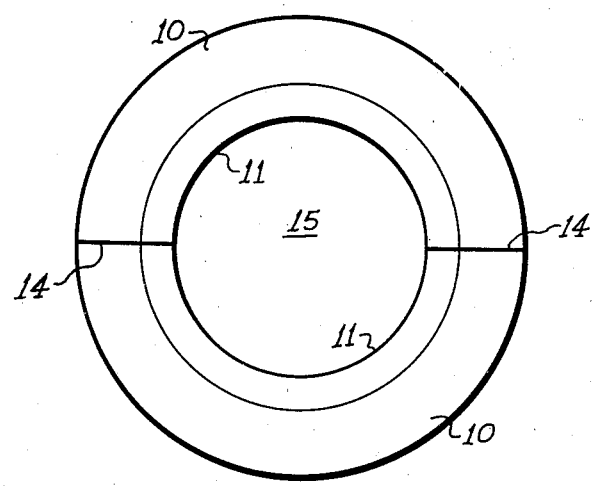
Figure 1:
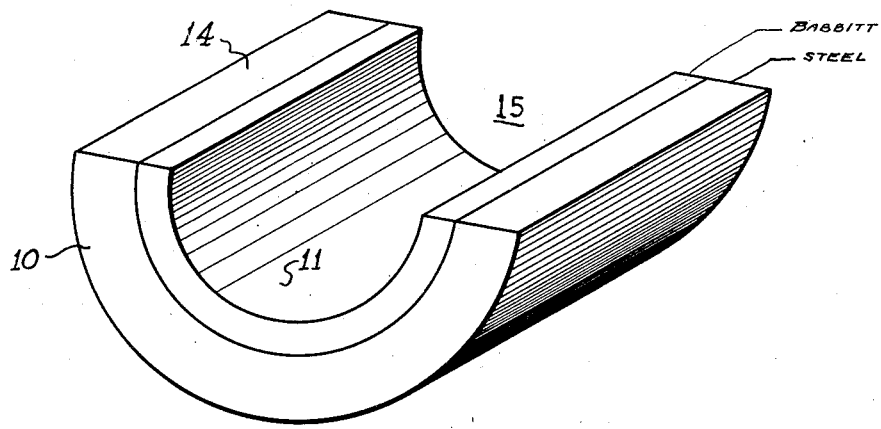

A bearing according to our invention is shown in the accompanying drawing. In this drawing, Fig. 1 shows one half of a cylindrical sleeve type bearing of our invention;

Fig. 2 shows two halves of a cylindrical sleeve type bearing assembled.

The drawing shows a sleeve type bearing consisting of two halves, each comprising a hard backing 10 and a soft liner member 11. The halves meet on lines 14 to define space 15 in which may rotate a shaft member, not shown. In the bearing shown, the backing is of hard steel, brass, or bronze, etc., and the liner member is a soft alloy.

The present known characteristics and requirements of the liner are as follows:

First, it has a lesser tendency to crack than does a liner member of the commonly accepted thickness, .0150 inch, and yet no appreciably greater tendency to crack than the too thin liner, .0002 to .0005 inch. We have discovered that .0050 inch is the critical maximum dimension for noncracking liners.

Second, it has the capacity of absorbing particles from the normal clearance between the bearing and the shaft member because its thickness is substantially as great as what is now the commonly accepted clearance between shafts and bearing members, where the bearings are of the type under consideration, that clearance being in the neighborhood of .0005 to .0025 inch.

It will be observed that particles within that clearance are of necessity no greater than .0025 inch in dimension. Consequently, a liner member of approximately that thickness will function satisfactorily for the absorption of such particles.

The liner member may be combined with the backing member in any suitable manner, such as dipping, spraying, plating, fusing, high pressure, etc.

As an example of what has been found to be a suitable bearing, we indicate the following:

1. The backing was of low carbon steel, 2 inches in diameter, .0500 inch thick, approximately.

2. The liner member was from .0010 to .0050 inch thick, and was composed of a babbitt of 6.18% copper, 2% antimony, 88.08% tin, and 3.01% nickel, and .72% cadmium.

Other bearings found suitable employed backings of steel, brass, and/or bronze, in various mixtures, and a thin liner of 3% copper, 8% antimony, and 89% tin.

In terms of ten thousandths, the dimensions heretofore given are here listed:

| | |
|---|---|
| Clearance | 5 to 25 |
| Particles | 5 to 25 |
| Too thick liner | 150 |
| Too thin liner | 2 to 5 |
| Our liner | 10 to 50 |
| Backings | 500 |

Now having described a bearing which embodies our invention, we present the following claim which determines our invention.

We claim:

A bearing combination consisting of a shaft and a bearing having a clearance between them in which particles may be present, the clearance being within the range of 5 to 25 ten thousandths inches, the bearing consisting of at least two integrally united layers, one being a supporting layer of a hard metal and the other being a bearing layer of a soft, readily conformable, particle absorbing bearing metal, the bearing layer having a thickness greater than the actual clearance between the shaft and bearing but not exceeding fifty ten thousandths inches approximately.

RANDOLPH L. STRICKLAND.
JEROME J. FRANK.